(12) United States Patent
Yu et al.

(10) Patent No.: US 10,763,536 B2
(45) Date of Patent: Sep. 1, 2020

(54) LARGE ENERGY DENSITY BATTERIES

(71) Applicant: The Texas A&M University System, College Station, TX (US)

(72) Inventors: Choongho Yu, College Station, TX (US); Xiong Pu, Luoyang (CN)

(73) Assignee: The Texas A&M University System, College Station, TX (US)

( * ) Notice: Subject to any disclaimer, the term of this patent is extended or adjusted under 35 U.S.C. 154(b) by 359 days.

(21) Appl. No.: 15/325,991

(22) PCT Filed: Jul. 15, 2015

(86) PCT No.: PCT/US2015/040643
§ 371 (c)(1),
(2) Date: Jan. 12, 2017

(87) PCT Pub. No.: WO2016/011196
PCT Pub. Date: Jan. 21, 2016

(65) Prior Publication Data
US 2017/0170511 A1    Jun. 15, 2017

Related U.S. Application Data

(60) Provisional application No. 62/025,000, filed on Jul. 15, 2014.

(51) Int. Cl.
*H01M 10/052* (2010.01)
*H01M 4/133* (2010.01)
(Continued)

(52) U.S. Cl.
CPC ....... *H01M 10/052* (2013.01); *H01M 2/1613* (2013.01); *H01M 4/133* (2013.01);
(Continued)

(58) Field of Classification Search
None
See application file for complete search history.

(56) References Cited

U.S. PATENT DOCUMENTS

| | | | |
|---|---|---|---|
| 6,358,643 B1 * | 3/2002 | Katz | C07C 227/32 |
| | | | 429/105 |
| 7,615,206 B2 * | 11/2009 | Sandhage | B81C 99/0095 |
| | | | 257/202 |

(Continued)

OTHER PUBLICATIONS

Nitz, K. Synthesis and Functionalization of Ordered Mesoporous Carbons for Catalytic Applications, Ruhr Universitat Bochum, (dissertation), 2009, abstract (Year: 2009).*

(Continued)

*Primary Examiner* — Daniel S Gatewood
(74) *Attorney, Agent, or Firm* — Winstead PC

(57) ABSTRACT

Embodiments of the claimed invention are directed to a device, comprising: an anode that includes a lithiated silicon-based material and a sulfur-based cathode, wherein the anode and the cathode are designed to have mesoporous structures. In certain embodiments, the sulfur-based cathode is a mesoporous carbon structure comprising sulfur within the mesopores. A further embodiment of the invention is directed to a device comprising a semi-liquid lithium-sulfur battery comprising a lithium anode and a sulfur cathode. In certain embodiments, the sulfur cathode comprises a liquid catholyte, which is housed within a reservoir that is a carbon nanotube sponge. An additional embodiment of the invention is directed to a method for producing a lithiated silicon anode and a sulfur-based cathode.

16 Claims, 10 Drawing Sheets

(51) Int. Cl.
*H01M 4/134* (2010.01)
*H01M 10/0566* (2010.01)
*H01M 2/16* (2006.01)
*H01M 4/38* (2006.01)
*H01M 4/66* (2006.01)
*H01M 4/02* (2006.01)
*H01M 4/1393* (2010.01)

(52) U.S. Cl.
CPC ............ *H01M 4/134* (2013.01); *H01M 4/38* (2013.01); *H01M 4/663* (2013.01); *H01M 10/0566* (2013.01); *H01M 4/1393* (2013.01); *H01M 2004/021* (2013.01)

(56) References Cited

U.S. PATENT DOCUMENTS

| | | | |
|---|---|---|---|
| 2006/0073089 A1* | 4/2006 | Ajayan | A61L 27/08 423/447.2 |
| 2011/0200883 A1* | 8/2011 | Cui | H01M 4/049 429/231.4 |
| 2014/0050973 A1* | 2/2014 | Manthiram | H01M 2/1646 429/188 |
| 2014/0193723 A1* | 7/2014 | Kumaresan | H01M 4/02 429/406 |

OTHER PUBLICATIONS

Chen et al, The preparations of nano-sulfur/MWCNTs and its electrochemical performance, Electrochim Acta, 55, 8062-8066 (Year: 2010).*

Nitz, J.; "Synthesis and Functionalization of Ordered Mesoporous Carbons for Catalytic Applications"; Ruhr Universität Bochum (dissertation); 2009.

* cited by examiner

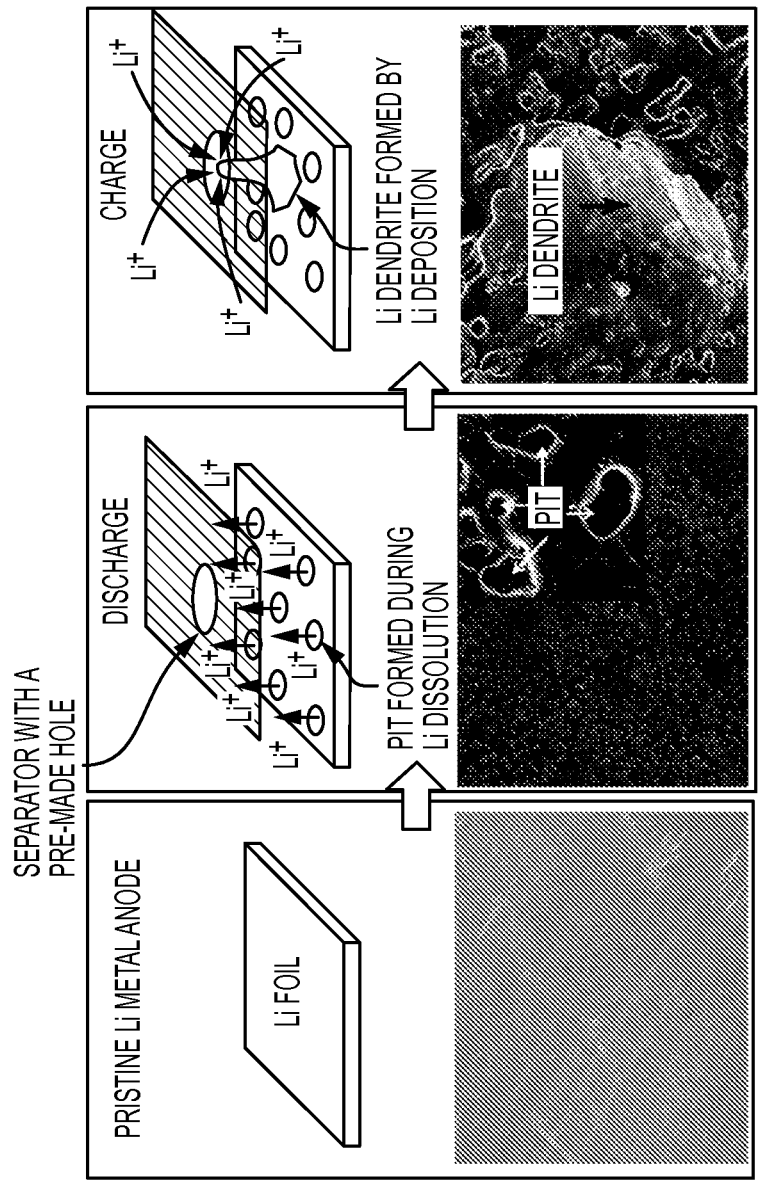

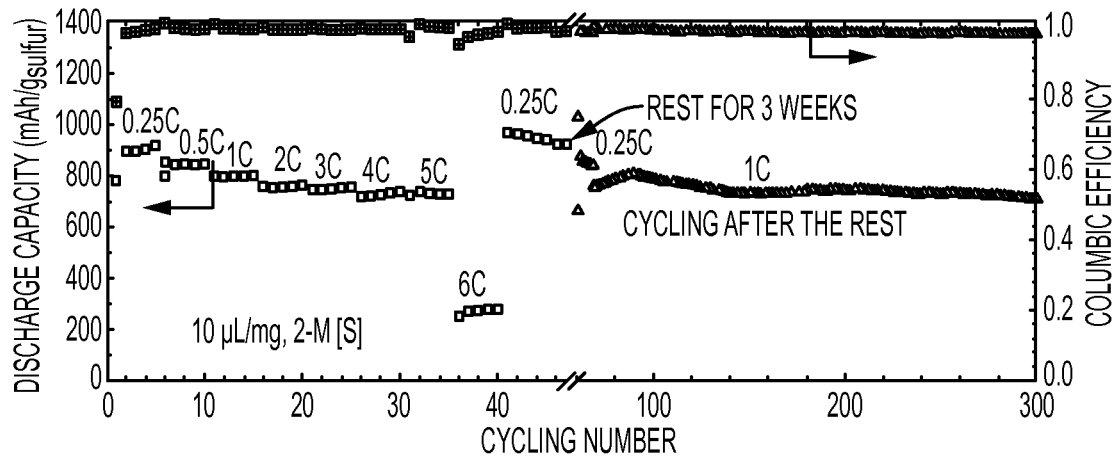
FIG. 9A
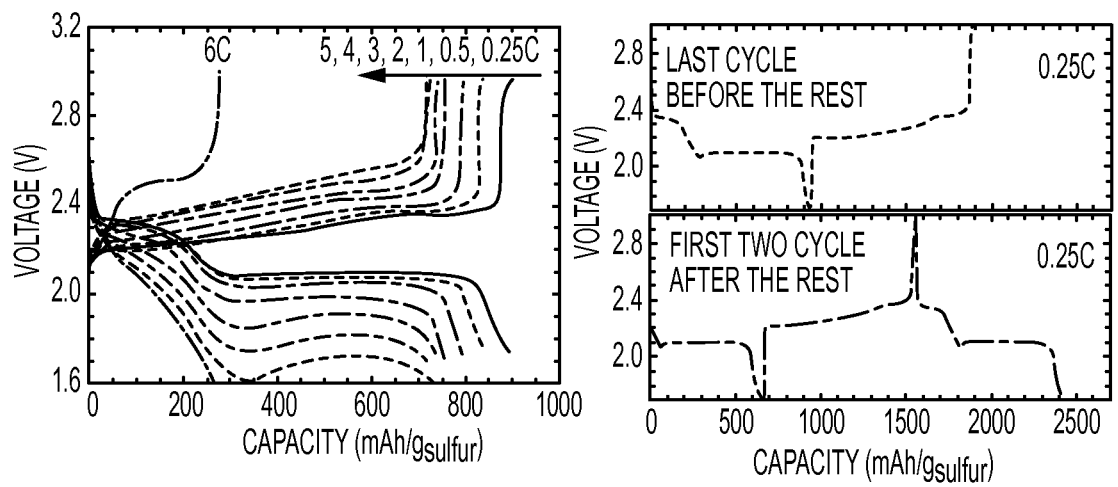
FIG. 9B
FIG. 9C

LARGE ENERGY DENSITY BATTERIES

CROSS-REFERENCE TO RELATED APPLICATIONS

This application claims the benefit of U.S. Provisional Patent Application Ser. No. 62/025,000, filed on Jul. 15, 2014, which is incorporated herein by reference in its entirety.

STATEMENT REGARDING FEDERALLY SPONSORED RESEARCH AND DEVELOPMENT

This invention was made with government support under Grant No. CMMI 1030958 awarded by the National Science Foundation and Grant No. 2011-0001645 awarded by the Pioneer Research Center Program through the National Research Foundation of Korea. The government has certain rights in the invention.

BACKGROUND OF THE INVENTION

The most widely used Li-ion batteries are $LiCoO_2$ based cells, which possess good energy density and life cycles. However, cobalt based cathodes are too expensive to be used for large-scale systems such as electric vehicles and renewable energy harvesting systems. Higher energy density, better reliability, and improved safety are also necessary for widespread use of Li-ion batteries. For instance, a single charge of an electric vehicle is unable to sustain current standard driving distance per charge (~500 km). Lithium-sulfur (Li—S) batteries have been investigated as a possible solution due to high energy density and inexpensive raw materials.

Sulfur undergoes the following overall redox reaction: $S_8+16\ Li^++16\ e^-\leftrightarrow 8\ Li_2S$. This reaction yields theoretical capacities of 1672 mAh/g with an average redox potential of ~2.2 V (vs. $Li/Li^+$). With a theoretical capacity of 3860 mAh/g for the Li metal anode, the theoretical energy density of Li—S batteries can be as high as 2567 Wh/kg. The performance of Li—S batteries is outstanding, compared to theoretical values of popular $LiCoO_2$-graphite based batteries (584 Wh/kg and 376 Wh/kg when $LiCoO_2$ capacity is considered as 274 mAh/g and 140 mAh/g, respectively). Considering ~1/300 of sulfur price compared to cobalt, Li—S batteries are strong candidates as the next generation energy storage devices provided that the following current major drawbacks are eliminated or alleviated.

Significant reduction in actual capacity is partly caused by electrically insulating sulfur due to poor charge transfer, but this has been greatly alleviated by adding electrically conducting carbon structures to sulfur. On the contrary, the Li metal anode in Li—S batteries is unsafe, unreliable, and expensive. Li—S batteries also have relatively fast capacity fading during cycling due to polysulfide shuttle mechanisms, making the lifetime of Li—S batteries shorter than the demand of current energy storage devices.

During the lithiation of sulfur in a cathode, a series of polysulfides ($Li_2S_x$, x=3~8) are produced as intermediates. They can easily dissolve in organic solvents and thereby diffuse to the lithium metal (anode) side, where they are reduced to solid precipitates such as $Li_2S$ and $Li_2S_2$. The repeated shuttle process during the cycling of the cell considerably reduces the active mass in the cathode, leading to low columbic efficiency and fast capacity fading due to the polysulfide shuttle phenomenon.

To overcome these issues, intensive research has been focused on trapping the solid elemental sulfur inside various carbonaceous nanostructures (e.g. mesoporous carbon, graphene, graphene oxides, and carbon nanotubes) by impregnating the molten sulfur into inner pores. The polysulfide shuttle was slowed since the pore reserved a portion of dissolved polysulfides. Nevertheless, the large quantity of inactive carbonaceous materials significantly reduces the weight percentage of sulfur in the electrode film (typically 30~50 wt. % considering the polymer binder and conductive additive), and thus the energy density of the battery cell.

In place of starting with solid sulfur, an approach is to use polysulfide-containing liquid catholyte as an active material rather than avoiding the high solubility of polysulfides in the electrolyte. Compared to the sluggish reaction of insulating solid phases, liquid catholyte can alleviate the aggregation of irreversible S or $Li_2S$, and achieve a higher utilization of active materials. Several recent studies have tried to add the polysulfide-containing electrolyte into the Li—S battery with either a sulfur-containing or a sulfur-free cathode. For the former configuration, polysulfides function as both the shuttle inhibitor and backup active materials For the latter, the electrode with light-weight carbonaceous materials (e.g. Ketjen black, Super P, and carbon nanotube (CNT) paper) is utilized to provide sites for redox reactions and paths for charge transfer.

Additionally, it has been noted that the Li metal in Li—S batteries causes a safety hazard and short life time due to the formation of lithium dendrite and an internal short-circuit, which may result in thermal runaway. Even after decades of research efforts, this problem has not been resolved sufficiently to see commercially available rechargeable batteries with a Li metal anode.

There is therefore a need for an improved lithium anode that can be used to realize the complete benefits of a lithium battery. It is an objective of the present invention to use lithiated Si instead of Li metal. The high theoretical capacity (4200 mAh/g) of silicon as anode makes it ideal to couple the high-capacity sulfur cathode.

There is also a need to achieve a long cycling life from Li—S batteries. This has been accomplished in novel semi-liquid Li—S batteries with highly porous CNT sponges as the "super-reservoir" for the liquid polysulfide catholyte. The Li—S rechargeable battery can be used in multiple applications including, without limitation, in electric vehicles.

SUMMARY OF THE INVENTION

Embodiments of the claimed invention are directed to a device, comprising: an anode that includes a lithiated silicon-based material and a sulfur-based cathode, wherein the anode and the cathode are designed to have mesoporous structures. In certain embodiments, the sulfur-based cathode is a mesoporous carbon structure comprising sulfur within the mesopores. In certain embodiments, the mesoporous carbon structure is CMK-8.

A further embodiment of the invention is directed to a device comprising a semi-liquid lithium-sulfur battery comprising a lithium anode and a sulfur cathode. In certain embodiments, the sulfur cathode comprises a liquid catholyte, which is housed within a reservoir that is a carbon nanotube sponge. In certain embodiments, the liquid catholyte is $Li_2S_6$.

A further embodiment of the invention is directed to a method comprising synthesizing a sulfur cathode and a silicon anode wherein the silicon anode is lithiated.

BRIEF DESCRIPTION OF THE DRAWINGS

FIGS. 3A-3E show internal short-circuit experiments. The discharge/charge profiles of batteries assembled with a separator with pre-made holes: (A) Li—S cell and (B) LSS cell. The inset of (A) is a photograph of a Celgard 2400 separator showing the premade holes. The inset of (B) is the cycling performance of the LSS battery. (C-E) The illustrations and SEM images for the morphology evolution of the Li metal surface in Li—S battery: the smooth surface of a pristine Li metal foil (C) was turned into a rough surface with pits after the first discharge (D), and then dendrites were formed during charge, making the cell internally short-circuited (E). The scale bars indicate 200 μm for (C) and (D); 20 μm for the inset of (D); and 100 μm for (E). All the charge/discharge were conducted at 0.5 C rate;

FIGS. 9A-9C shows the C-rate and resting performances of the semi-liquid Li—S cell. (A) C-rate performances (square points) of the Li—S cell with 10 μL/mg of 2-M [S] catholyte. After being rested for 3 weeks at charged state, the cell was cycled again (triangle points) at 0.25 C and 1 C rates consecutively. (B) Charge/discharge profiles of the Li—S cell at different C rates. (C) Charge/discharge profiles of the last cycle before the rest (upper) and first two cycles after the rest (bottom) at 0.25 C rate.

DETAILED DESCRIPTION OF EXEMPLARY EMBODIMENTS

The present disclosure is believed to be useful for applications involving energy storage devices and their use in a variety of applications. Aspects of the present disclosure have been found to be very useful and advantageous in applications involving various types of batteries, high-energy lithium ion batteries and components of batteries. While the present disclosure is not necessarily limited to such applications, various aspects of the disclosure may be appreciated through a discussion of various examples using this context.

An embodiment of the invention is directed to $Li_xSi$—S (LSS) batteries having excellent cycling performance compared to that of Li—S cells. Both internal and external short-circuit tests that were performed show the advantages of Li metal free LSS batteries over Li—S batteries in terms of safety and reliability. A LSS battery with reliable safety and stable cyclability is demonstrated herein as an aspect of the invention. The use of prelithiated Si as anode mitigates the safety hazard arising from the lithium dendrite formation on Li metal in Li—S batteries. Stable cyclability is achieved with proper design of a mesoporous structure in both electrodes to suppress the polysulfides shuttle of S and volume variation of Si.

In an embodiment of the invention, the S cathode and Si anode of the LSS battery are designed to have mesoporous structures. To accommodate the volume expansion of Si, mesoporous Si was synthesized by magnesiothermically reducing mesoporous silica, SBA-15 (hexagonal symmetry P6 mm), and then the mesoporous Si was further lithiated for the use of anode in the full cell. Sulfur was infused into CMK-8, which serves as both charge transfer path and polysulfide reservoir. A CNT paper was inserted between cathode and separator to block the polysulfides shuttle.

Figure 1A:
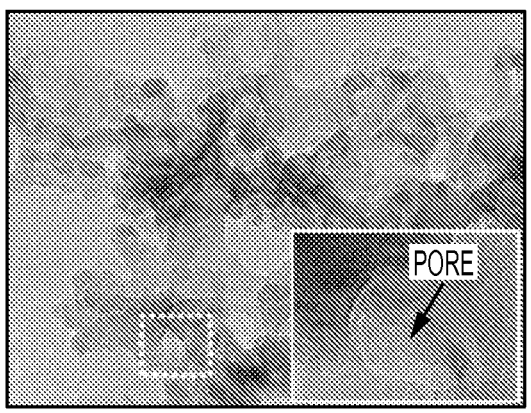
FIGS. 1A-1D show morphologies of mesoporous Si and S/CMK-8. (A) transmission electron microscope (TEM) image of mesoporous Si showing highly porous morphology. The inset of (A) shows one pore of the mesoporous Si. (B) TEM image of the carbon coated mesoporous Si (C-mSi) with several nanometer-thick coating layer of carbon. (C) TEM image of CMK-8 with ordered mesoporous structures. (D) TEM image of S/CMK-8 whose pores were filled by sulfur. The scale bars indicate 20 nm for (A); 5 nm for the inset and (B); and 50 nm for (C) and (D)
Figure 1B:
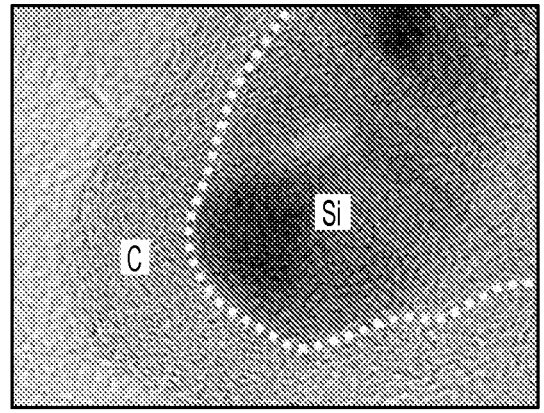

FIG. 1A shows TEM images of our highly porous Si obtained from the reduction reaction of silica by Mg ($2Mg+SiO_2 \rightarrow Si+2MgO$). The inset indicates the pore size is ~10 nm. The obtained mesoporous Si has a cubic (diamond) crystal structure, as indicated by X-ray diffraction (XRD) patterns. Only a trace amount of residual MgO was observed due to a washing process with 2-M HCl and 5-wt % HF. A subsequent carbon coating process resulted in an outer layer with a thickness of 5~10 nm (FIG. 1B), which is expected to facilitate electron transfer in anode.

Figure 1C:
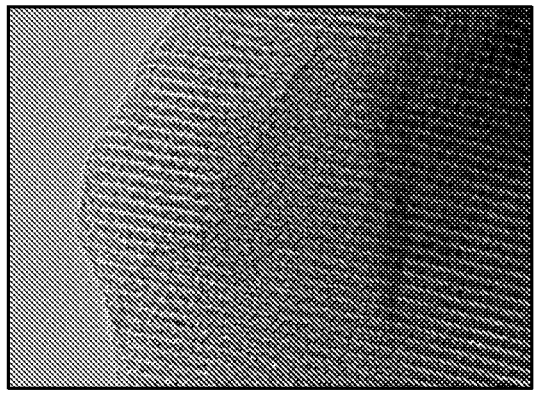
Figure 1D:
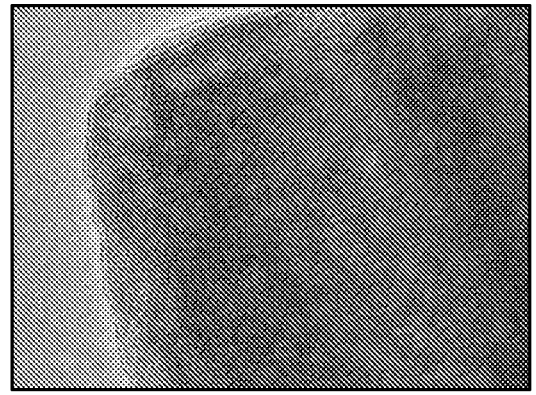

As for the S cathode, ordered CMK-8 was utilized as an electrically conducting reservoir for polysulfides to improve both the rate capability and cyclability. CMK-8, replicated from KIT-6 silica template (cubic $Ia\bar{3}d$), has a 3-dimensional (3D) cubic structure with interpenetrating bicontinuous networks of channels. The TEM image of CMK-8 (FIG. 1C) shows its ordered porous structure. After infusing melted S into CMK-8 with 6:4 weight ratio of S:CMK-8, the CMK-8 pores were completely filled as indicated by TEM image of S/CMK-8 (FIG. 1D). The size of S/CMK-8 particles was not significantly changed, confirming that most of the sulfur diffused into the inner pores. The major peak in the EDS spectra of the S/CMK-8 was found to be sulfur.

An embodiment of the invention is directed to lithiation of one of the electrodes to assemble the Si and S electrodes into a full cell. Lithiation of the silicon electrode was because of the difficulty in handling $Li_2S$ due to its high reactivity to moisture in atmosphere. Facile lithiation of Si by making direct contact of the Si electrode with a Li metal was performed by taking advantage of the difference between electrochemical potentials of Si and Li. A Li metal foil was clamped with the C-mSi electrode soaked by an electrolyte between two glass slides with a clipper for 12 h. A complete lithiation of Si was confirmed by the charge profile of the pre-lithiated C-mSi electrode at 100 mA/g in a half cell, which shows a delithiation capacity up to 2997 mAh/g. The XRD of the lithiated C-mSi electrode also indicates Si peaks vanished and $Li_xSi$ peaks appeared after lithiation. The stable cycling at 1 A/g of the pre-lithiated C-mSi electrode for ~300 cycles with 1000 mAh/g as the discharge limit and 1.2 V as charge limit proves the feasibility of this lithiation method.

Figure 2A:
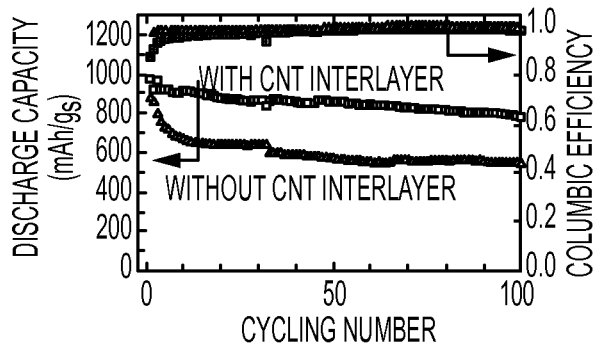
FIGS. 2A-2F show the electrochemical performances of $Li_xSi$—S (LSS) battery. (A) Discharge capacities and columbic efficiencies of the LSS battery with and without CNT interlayer at 0.5 C. (B) The charge/discharge voltage profiles of the LiSS battery with a CNT interlayer at 1, 5, 10, 50, and 100 cycle. (C) Rate capability of the LSS battery, and (D) corresponding voltage profiles. The scanning electron microscope (SEM) images of the CNT interlayer after (E) 100 cycles and prior to cycling (F). The inset of (E) is the energy dispersive spectroscopy (EDS) results on the CNT interlayer at charged state after 100 cycles, showing the presence of sulfur covering the CNT networks. The scale bar is 200 nm.
Figure 2B:
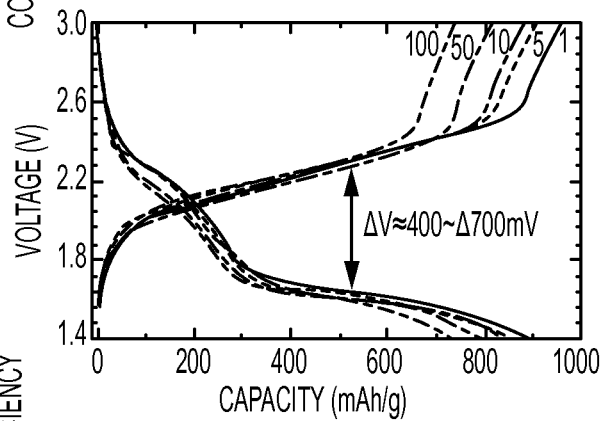

The LSS full cells with and without the CNT interlayer were tested and their cycling performances are shown in FIG. 2A. The LSS full cell "without" CNT interlayer has an initial discharge capacity of 875 mAh/g, which is smaller than that of a Li—S cell. After 100 cycles, the capacity was decreased to 550 mAh/g, yielding capacity retention of 63%. When CNT interlayer was inserted, the discharge capacities of the 1st and 100th cycle increased to 970 mAh/g and 780 mAh/g, respectively, resulting in capacity retention of 80% at 100th cycle. The capacity retention of the LSS cell is comparable to the Li—S cell although the capacities of the LSS full cells are slightly smaller than that of the half cell counterpart (Li—S cell). The discharge potential profiles (FIG. 2B) of the LSS full cell at 0.5 C rate show two typical potential plateaus, ~2.2 V and ~1.6 V, slightly lower than those of the Li—S cell due to the 0~0.4 V (vs $Li/Li^+$) delithiation potential of the Si electrode. The voltage difference (0.4 V~0.7 V) between charge and discharge of the LSS full cell was observed to be slightly larger than those of the Li—S cell.

The improvement in the cyclability can be attributed to the bi-functional CNT interlayer, which serve as a reservoir to capture the soluble polysulfides and a current collector by providing electron transfer paths. A layer of sulfur was observed on the CNT layer at the charged state in the SEM image (FIG. 2E) and confirmed by the EDS (the inset of FIG. 2E), in comparison to the visible CNT bundles before cycling (FIG. 2F).

Figure 2C:
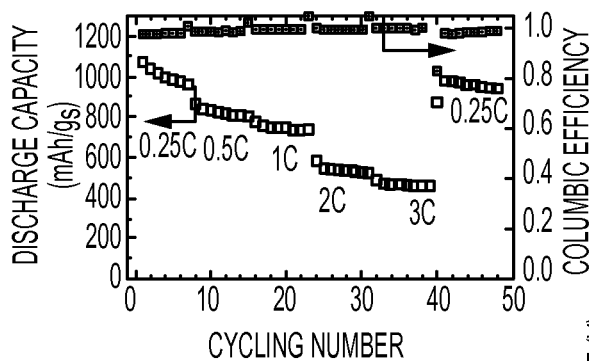
Figure 2D:
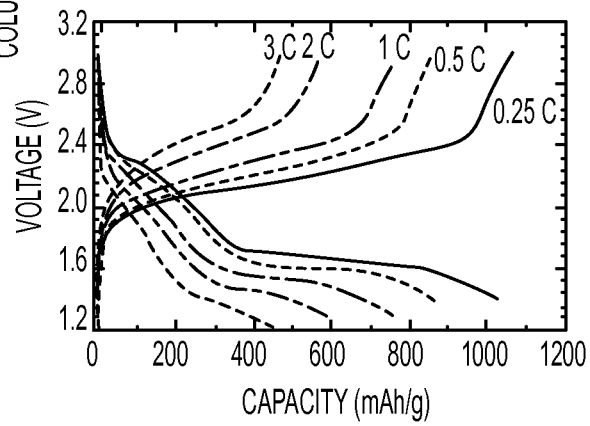
Figure 2E:
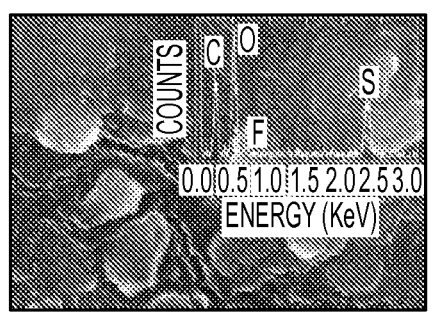
Figure 2F:
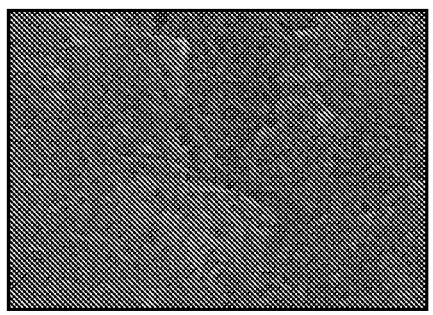

The rate capability of the LSS full cell with CNT interlayer and the corresponding voltage profile are shown in FIGS. 2C and 2D, respectively. The cut-off discharge voltage was 1.4 V for 0.25 C and 0.5 C; 1.3 V for 1 C and 2 C; and 1.2 V for 3 C. At 0.25 C rate, the discharge capacities were measured to be 1070 mAh/g and 960 mAh/g for $1^{st}$ and $8^{th}$ cycle, respectively. The average discharge capacity at 0.5 C, 1 C, 2 C, and 3 C was 823 mAh/g, 748 mAh/g, 540 mAh/g, and 465 mAh/g respectively. After 48 cycles, a capacity of 939 mAh/g can be recovered at 0.25 C rate, corresponding to a capacity retention of 87%. The rate capability of the LSS full cell is comparable with that of Li—S cell.

Figure 3B:
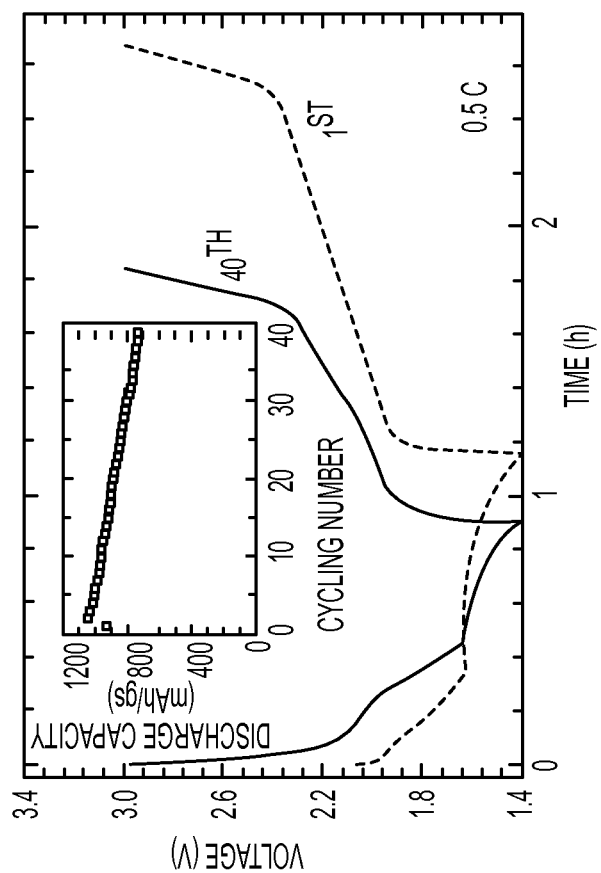
Figure 3A:
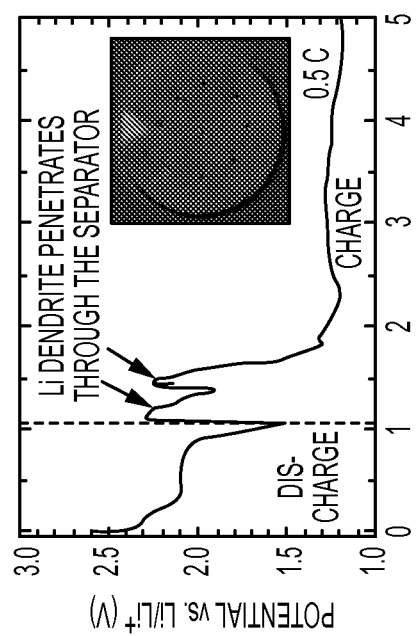

Both LSS cell and Li—S cell were tested under common failure conditions that often make the Li—S battery unsafe and unreliable, which are very important aspects to be resolved for practical use. For example, an internal short-circuit upon repeated charge/discharge and an external short-circuit due to improper wiring are high risk cases. In this study, the internal short-circuit was simulated by creating holes on a separator membrane (the inset of FIG. 3A). The Li—S cell cannot be recharged after delivering a capacity of ~800 mAh/g for the initial discharge at 0.5 C rate, as shown in FIG. 3A. During the charge, the potential was suddenly dropped, indicating internal short circuits. On the contrary, the LSS cell was discharged/charged over 40 cycles with a discharge capacity of 925 mAh/g and 720 mAh/g for the $1^{st}$ and $40^{th}$ cycle, respectively, at 0.5 C rate (FIG. 3B).

The failure of the Li—S cell occurred because of Li dendrite formation accelerated on the Li metal at the pre-made holes of the separator membrane. As illustrated in FIG. 3D, Li metal dissolution creates a large number of pits during the discharge process. The SEM images clearly indicate a few 100 μm pits, suggesting excessive Li has been lost from the Li metal. It should be noted that the Li metal had a smooth surface before cycling as confirmed by the SEM image shown in FIG. 3C. Upon the charge process, Li deposition is favorable through the holes due to less resistance, leading to a rapid growth of Li dendrites (FIG. 3E). The SEM image shows a selective Li deposition showing a circular-shaped edge. When the dendrite reaches the surface of cathode, the cell becomes internally shorted. Once a short-circuit occurs, Li metal reacts vigorously with the cathode, lowering the cell voltage (as shown in FIG. 3A), which may trigger a thermal runaway for large-scale cells. In a Li—S cell without intentionally created holes on a membrane, heterogeneous nucleation responsible for the formation of Li dendrites could start from grain boundaries or surface scratches on the Li metal anode, and the dendrites may grow at a high rate with a condition of a high operating current. As for the LSS cell, Li is alloyed with Si during the charge, alleviating the dendrite formation. Excessive Li dissolution can be avoided and thereby a Li deposition on anode becomes unfavorable.

Figures 4A, 4B:
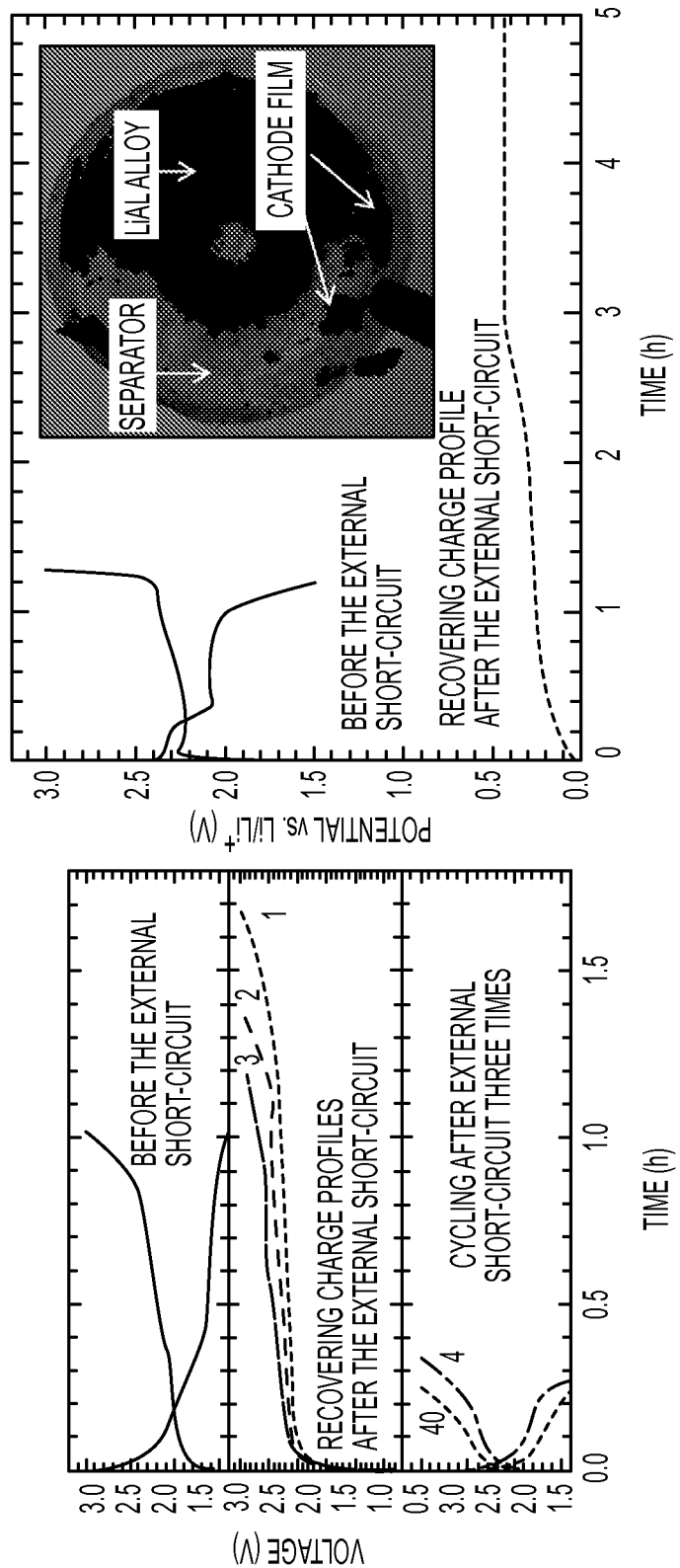
FIGS. 4A-4B shows external short-circuit experiments. (A) The charge/discharge profile of a LSS battery before external short-circuit (first row), the recovering charge profile after 3-h external short-circuit three times (second row), and the voltage profiles at $4^{th}$ and $40^{th}$ cycle of the LSS battery after the external short-circuit three times (third row). (B) The charge/discharge profile of a Li—S battery before the external short-circuit, and the recovering charge profile after the first external short-circuit. The inset of (B) is a photograph, showing the cathode film covered by wrinkled LiAl alloy. Due to the powdery LiAl alloy, a part of cathode was lost, exposing the white separator. All the charge/discharge were conducted at 0.5 C rate.

An external short-circuit, another common failure mode, was also tested for both LSS and Li—S cells. After 6 cycles of normal charge/discharge at 0.5 C rate, the charged LSS cell was externally short-circuited with a 100 mOhm copper wire for 3 hours, and then was charged back to 3 V at 0.5 C rate. Even after repeating the external short-circuit 3 times for 3 hours each, the LSS cell was recovered and charged back to 3 V, as shown in FIG. 4A. The following cycling (1.4~3V) of this LSS cell still showed a reversible discharge capacity of 200~250 mAh/g for about 40 cycles at 0.5 C rate even after the severe conditions for degradation. In contrast, the Li—S cell cannot be recovered after the first external short-circuit. As shown in FIG. 4B, the Li—S cell, delivering a capacity of 940 mAh/g before the short-circuit, cannot be charged back to 3 V and shows a voltage constant at ~0.43 V. This is because the Al current collector was alloyed with Li and formed the Li—Al alloy during the external short-circuit, which becomes powders after the extraction of Li ion during the following charge process (Li extraction out of the Li—Al alloy). The photograph (the inset of FIG. 4B) of the cathode detached from the Li—S cell shows a part of cathode is removed and the Al foil was severely wrinkled.

In an embodiment of the invention, Li metal free LSS full cells are designed with mesoporous active materials for both lithiated Si anode and S cathode. Stable cycling with capacity retention of 80% over 100 cycles was achieved, which is by far the best cycling performances for LSS full cells with organic electrolytes. The LSS cell also showed excellent high-rate capabilities, delivering a discharge capacity of 465 mAh/g even at 3 C rate. The excellent electrochemical performances can be attributed to the alleviation of the volume change with mesoporous lithiated Si and the suppression of polysulfides shuttle with porous carbon CMK-8 and bi-functional CNT interlayers.

More importantly, both internal and external short-circuit experiments demonstrated that our LSS cells have better reliability and safety over Li—S cells. The failure mechanism in Li—S battery was found to be due to dendrite formation during charge caused by excessive Li dissolution during discharge (for internal short-circuit) as well as powdery Al caused by extracting Li (discharge) out of Li—Al alloy formed during charge (for external short-circuit).

An embodiment of the invention is directed to achieving a long cycling life from Li—S batteries. This is accomplished in novel semi-liquid Li—S batteries with highly porous CNT sponges as the "super-reservoir" for the liquid polysulfide catholyte. Embodiments of the invention are directed to novel semi-liquid Li—S batteries with high energy density, long cycling life and high C-rate capability, by using the CNT sponge as a reservoir for liquid-type active materials.

In an embodiment of the invention, the flexible CNT sponge is synthesized by a CVD method. The effects of catholyte concentration and loading volume on the battery performances have been systematically investigated, so as to achieve high sulfur weight percentage and long cycling life. Very high capacity retention (81.4%) and low capacity fading rate (~0.023% per cycle) were achieved over 800 cycles for a Li—S cell with about 56 wt. % equivalent sulfur in the electrode. Due to the absence of the Al current collector, the electrode energy density of our Li—S cell can be much higher than that of many previously reported studies and that of current Li-ion batteries. Excellent C-rate capability was obtained as well at even 5 C rate. The outstanding performances of our semi-liquid Li—S battery were attributed to the porous structure of the CNT sponge and the suppressed shuttle by concentrated $LiNO_3$ additive in the catholyte.

Figure 5A:
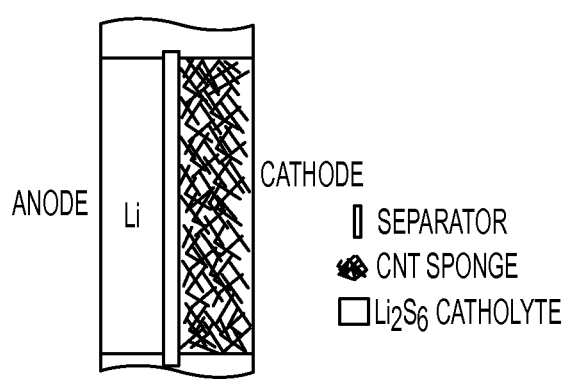
FIGS. 5A-5D shows a semi-liquid Li—S battery with CNT sponge as the "catholyte reservoir". (A) Scheme of semi-liquid Li—S battery using dissolved $Li_2S_6$ as liquid-type active materials in cathode. (B) The photo of a piece of CNT sponge synthesized by the CVD method. (C) SEM and (D) TEM images of the CNT sponge. The scale bar is 200 nm, 100 nm and 10 nm for (C), (D) and the inset in (D), respectively.
Figure 5B:
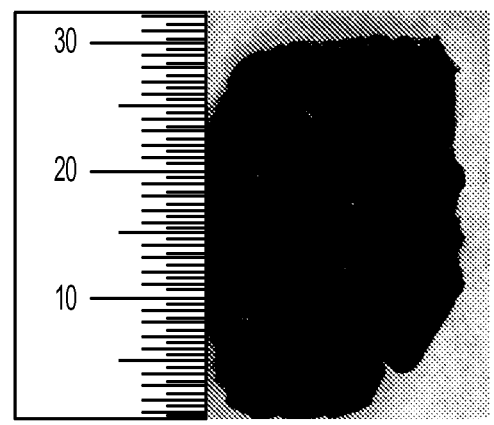
Figure 5C:
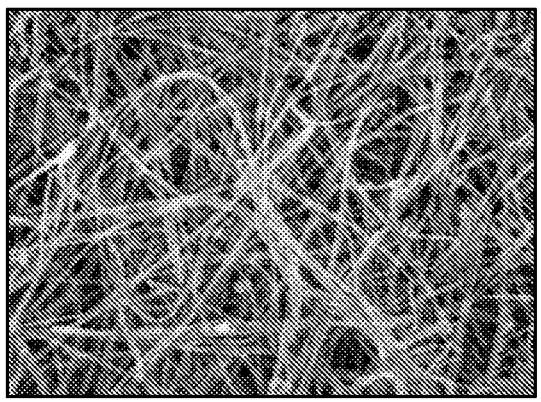
Figure 5D:
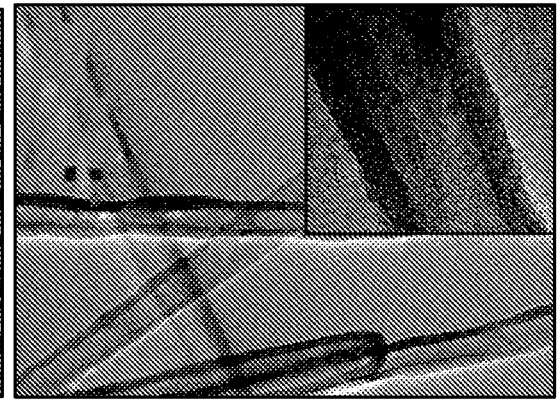

FIG. 5A shows the schematic configuration of our semi-liquid Li—S battery. Polysulfide $Li_2S_6$ dissolved in the electrolyte (1-M LiTFSI+0.5-M $LiNO_3$ in DOL:DME=1:1 by volume) was used as the liquid-type active material. 0.5-M $LiNO_3$ was added into the catholyte to stabilize the surface of Li metal and suppress the polyfulfides shuttle. CNT sponge synthesized by a CVD method was employed as a reservoir of $LiS_6$-containing catholyte, which can not only confine the liquid catholyte but also provide transfer paths for both electrons and Li ions. Though CNTs are physically bonded together, the sponge is elastic and can recover to its original shape after removing a gentle finger pressure. The mechanical flexibility and elasticity make the sponge suitable for a current collector-free electrode for the Li—S battery. Moreover, the porous structure and high conductivity of the sponge allow high loading volume of catholyte and thereby high equivalent weight percentage of sulfur, which together with the absence of Al current collector can significantly improve the energy density of the total electrode, comparing to traditional design with solid-phase sulfur. FIG. 5B shows a photo of a piece of CNT sponge. FIG. 5C is a SEM image of the CNT sponge, showing the porous morphology and the intertwined CNTs. According to TEM images in FIG. 5D, the CNT is multi-walled nanotube and the diameter is around 20~30 nm.

Figure 6A:
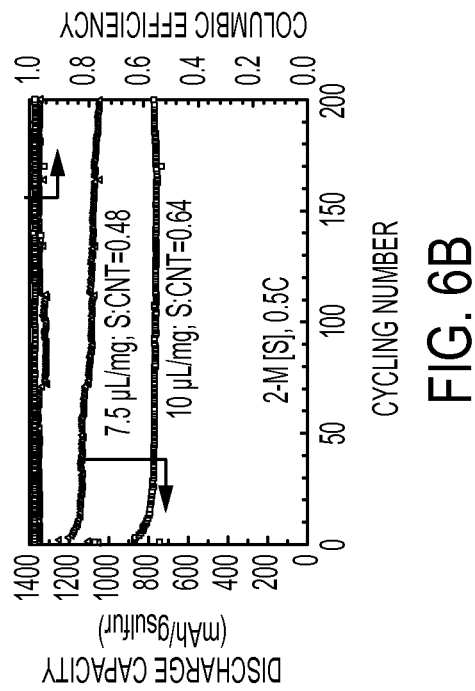
FIGS. 6A-6C shows the electrochemical performances of the semi-liquid Li—S battery. (A) Discharge/charge profiles of first two cycles of semi-liquid Li—S cells at 0.5 C rate. The molar concentration of [S] atom in the catholyte is 2-M for the upper plot and 4-M for the bottom plot. Cycling performances of cells with different loading volumes of 2-M [S] catholyte (B) and 4-M [S] catholyte (C) at 0.5 C rate. The ratio of CNT:S is weight ratio.

The concentration and loading volume of polysulfide catholyte have been varied to study their effects on electrochemical performances of the semi-liquid Li—S battery. Two different concentrations were used, i.e. 2-M and 4-M atomic concentrations of sulfur (equivalent to ⅓-M and ⅔-M $Li_2S_6$, respectively). The catholyte loading volume was varied between 7.5~15 μL per milligram of CNT. All the freshly assembled batteries have open circuit voltages around 2.27~2.28 V. They were cycled between 1.7~3 V with discharge at first. FIG. 6A shows the voltage variation vs. capacity (calculated based on the equivalent weight of sulfur) of the first two cycles of Li—S cells with 2-M and 4-M [S] catholyte at 0.5 C rate, respectively. For the first discharge, typical voltage plateau ~2.3 V in conventional solid-phase Li—S batteries cannot be observed, due to the absence of its corresponding reduction reaction of $S_8$ to $Li_2S_6$. The subsequent second discharge shows both voltage plateaus (~2.3 V and ~2.1 V) and an increase in capacity compared to the first discharge, indicating the conversion of polysulfides to elemental sulfur at the end of the first charge. For cells with 7.5 μL/mg of 2-M and 4-M [S] catholyte, the second discharge capacities are respectively 1248 mAh/g and 1224 mAh/g, which respectively drop to 873 and 767 mAh/g when increasing the catholyte volume to 10 μL/mg.

Figure 6B:
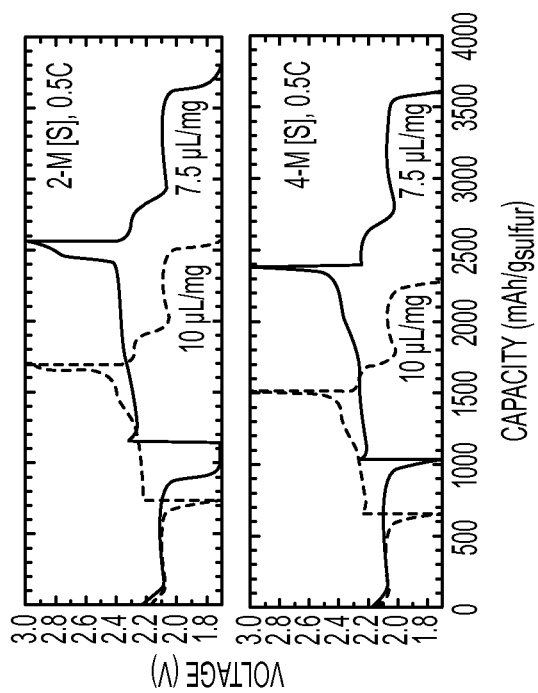
Figure 6C:
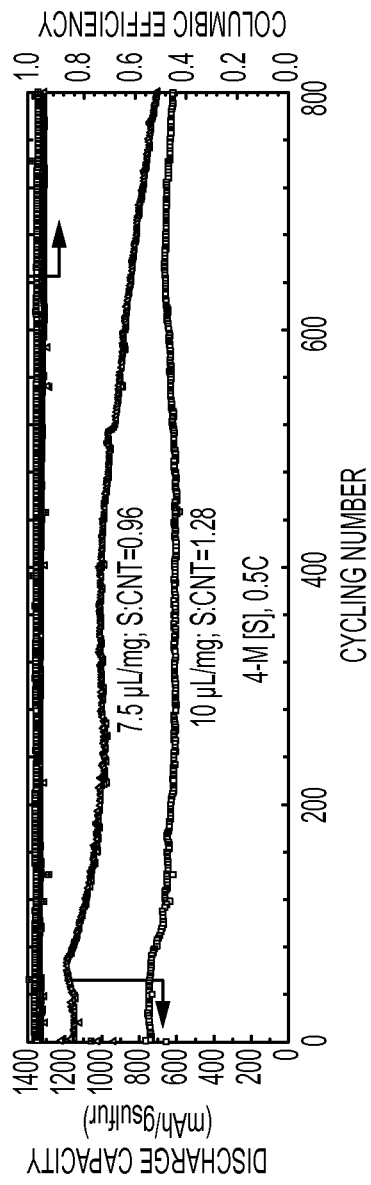

FIGS. 6B and 6C show the excellent cycling performances of above four semi-liquid Li—S cells at 0.5 C rate. The retained discharge capacities for cells with 7.5 and 10 μL/mg of 2-M [S] catholyte are 1044 and 771 mAh/g after 200 cycles, corresponding to capacity retentions of 83.7% and 88.3% (compared to the second discharge capacities), respectively. It should be noted that the cycling of the cell with 10 μL/mg of 2-M [S] catholyte can be elongated to 450 cycles with a retained capacity of 815 mAh/g. As for two cells with 4-M [S] catholyte, both of them achieve excellent cycling performances for ~800 cycles (see FIG. 2C). For the cell with 7.5 μL/mg of 4-M [S] catholyte, the retained capacity after 800 cycles is 706 mAh/g, equivalent to a capacity retention of 57.7%. The cell with 10 μL/mg of 4-M [S] catholyte achieves 624 mAh/g discharge capacity and 81.4% capacity retention after 800 deep cycles. More importantly, the capacity fading rate per cycle for the cell with 10 μL/mg of 4-M [S] catholyte is as low as 0.023% in 800 cycles, comparable with or better than most recent reports with long-cycling performances. Similar cycling performances (81.8% capacity retention and 0.023% fading rate in 800 cycles) are also obtained for a cell with even larger loading of 4-M [S] catholyte (15 μL/mg catholyte, and 65.7 wt. % sulfur). The columbic efficiencies of our Li—S cells throughout the cycling (except the first cycle) are about 97%-100%, which is widely accepted to be due to the $LiNO_3$ additives in the catholyte.

Compared to cells with 7.5 μL/mg of catholyte, cells with larger volume of catholyte (10 and 15 μL/mg), show higher capacity retentions and slower capacity fading rates, which can be observed from FIG. 2C for cells with 4-M [S] catholyte. With 10 μL/mg of catholyte, the initial charge/discharge capacities are around ~800 mAh/g (about half of the theoretical capacity), which means large amount of polysulfides in the catholyte are not converted into solid sulfur/$Li_2S$ at the end of charge/discharge. The residual dissolved polysulfides in the catholyte can function as an inhibitor for the polysulfides shuttle due to the reduced polysulfides concentration polarization in the cells, and thereby improve cycling performances. For cells with 7.5 μL/mg catholyte, the capacities are larger and thus the amounts of retained polysulfides in the catholyte are less. In several reported studies, extra polysulfide additives in Li—S cells showed similar shuttle-inhibiting effect. The excellent cycling performances of the above cells are also attributed to the concentrated additive $LiNO_3$ (0.5-M) in the catholyte, which stabilize the surface of Li metal anode after several cycles and suppress the polysulfides shuttle.

Figure 7:
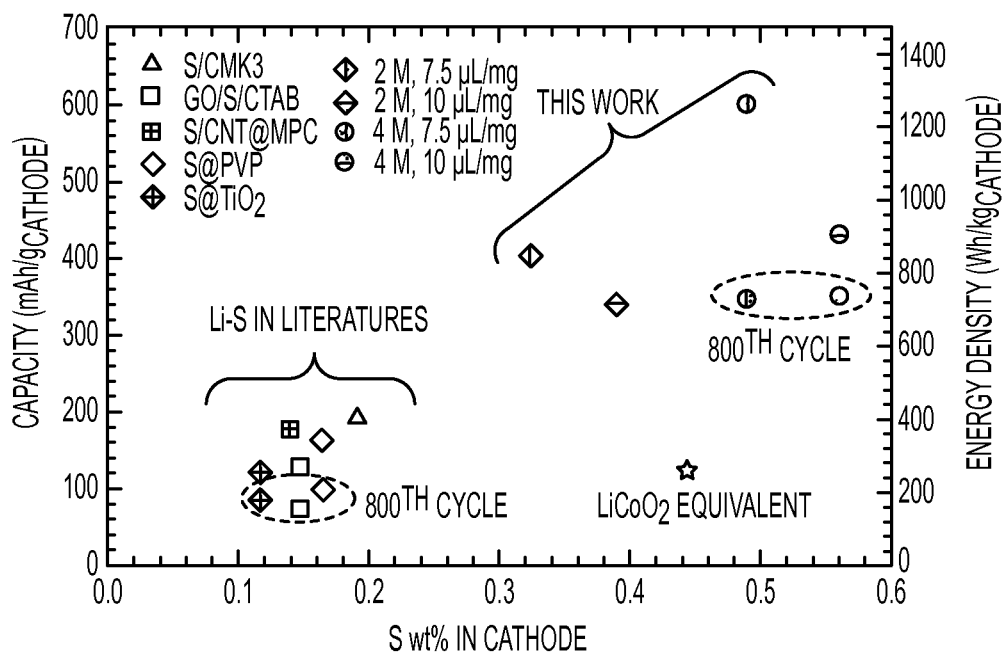
FIG. 7 shows a comparison of the sulfur weight percentage, specific capacity and energy density of the total electrode. Average voltage of 2.1 V was used for the calculation of energy density. Other than our semi-liquid electrodes, a 15 μm thick Al foil with 4 mg/cm² areal weight is considered for the calculations for all other solid electrodes. Points of S/CMK3, S/CNT@MPC, GO/S/CTAB, S@$TiO_2$, S@PVP are calculated based on the reported initial discharge capacity, sulfur weight percentage in electrode film and sulfur areal loading weight. For our semi-liquid Li—S cells, the second discharge capacities are used for calculations. Thick sulfur electrode is estimated with sulfur area loading weight of 4 mg/cm², 60 wt. % sulfur in electrode film, and capacity of 1000 mAh/g of sulfur. The equivalent capacity normalized by the weight of sulfur only for points of $LiCoO_2$ equivalent is 280 mAh/g, due to the larger voltage (~4 V). The lower point in the same column is the capacity after 800 cycles.

FIG. 7 compares the sulfur weight percentage, specific capacity and energy density (all calculated based on the total weight of the electrode) obtained from our semi-liquid Li—S cells with that from solid Li—S cells and Li-ion cells. For the solid electrode, weights of the polymer binder, conductive additive and Al current collector are all considered. For our Li—S cells, the equivalent weight percentages of sulfur in the composite (CNT/sulfur) are 32.4 wt. % and 39.0 wt. % for 7.5 and 10 μL/mg of 2-M [S] catholyte, and 49.0 wt. % and 56.1 wt. % for 7.5 and 10 μL/mg of 4-M [S] catholyte, respectively. These sulfur weight percentages are comparable with that of several representative works by impregnating solid sulfur in different porous structures (32 wt. %-58.8 wt. %), e.g. S/CMK3, S/CNT@MPC, GO/S/CTAB, S@PVP, S@$TiO_2$. However, considering the weight of Al current collector in these batteries, sulfur weight percentages in the total electrode are typically smaller than 20 wt. %, much smaller than that of our design, as shown in FIG. 7. Correspondingly, our semi-liquid Li—S batteries show much higher specific capacities and energy densities when calculated with the total weight of the electrode, especially for cells with 4-M [S] catholyte. The Li—S cell with 7.5 μL/mg of 4-M [S] catholyte has a specific capacity of 599.7 mAh/g and energy density of 1259.5 Wh/kg based on the weight of the electrode, nearly three times higher than that of most of the reported representatives. Our cell with 10 μL/mg of 4-M [S] catholyte, which shows the best cycling performance (see FIG. 6C), can also deliver a specific capacity of 430.3 mAh/g and energy density of 903.6 Wh/kg. We noted that the elemental sulfur area loading weight in the reported literature is low (~1 mg/$cm^2$), but even when estimated with 4 mg/$cm^2$, the obtained electrode specific capacity and energy density (372 mAh/g and 781 Wh/kg, respectively) are still much smaller than that of our semi-liquid Li—S cells with 4-M [S] catholyte. Moreover, increasing the electrode film thickness (or the areal loading weight) will seriously deteriorate the C-rate capability and mechanical properties of the electrode film. Hence, developing current collector-free electrode is an effective approach to improve the specific capacity and energy density of the total electrode, since it is almost inevitable to use large amount of conductive but inactive materials in sulfur electrode.

FIG. 7 also compares sulfur electrodes to the state-of-art commercial $LiCoO_2$ electrode. When normalized with the mass of sulfur, the capacity of practical $LiCoO_2$ electrode is equivalent to ~280 mAh/g of sulfur, due to the higher voltage (~4 V). Given that the area loading weight is 4 mg/$cm^2$, the energy density (including Al current collector) of $LiCoO_2$ electrode is less than one third of that of our semi-liquid Li—S cells with 4-M [S] catholyte. Even after 800 cycles (the lower point in the column), our semi-liquid Li—S cells still show energy densities more than 2 times higher than that of $LiCoO_2$ electrode. It should be noted that FIG. 3 only compares the energy density of the cathode. If replacing graphite anode with Li metal, Li—S cells are possible to achieve energy density ~5 times higher than that of current Li-ion cells, especially when our semi-liquid configuration is adopted.

Figure 8A:
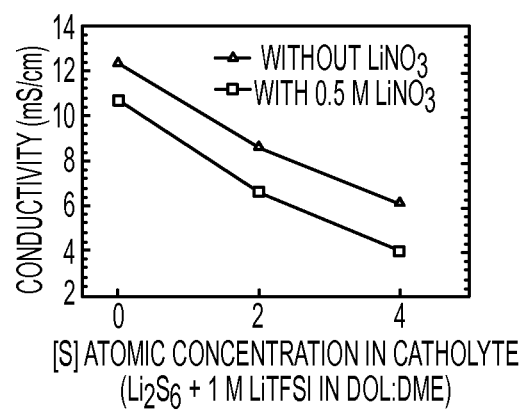
FIGS. 8A-8F shows the effect of the catholyte concentration and loading volume. (A) Variation of the ion conductivity of the catholyte with [S] concentrations. (B) Scheme of different loading volumes of catholyte in the CNT sponge. SEM images of CNT sponge electrodes in semi-liquid Li—S cells with 7.5 μg/cm² (C and E) and 10 μg/cm² (D and F) of 4 M [S] catholyte at charged state after cycling tests, without (C and D) and with (E and F) washing by DOL. After washing away the lithium salts (LiTFSI and $LiNO_3$), no aggregation of big and irreversible solid particles can be found in (E and F). The inset of (F) is an EDS spectrum showing the major content of sulfur at charged state. The scale bar is 2 μm for (C) and (D), and 200 nm for (E) and (F)
Figure 8B:
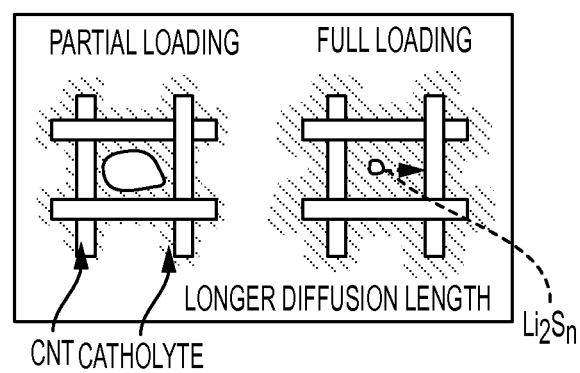
Figures 8C, 8D, 8E, 8F:

FIG. 8A shows the ion conductivity of the catholyte with different concentrations of polysulfide. The bare electrolyte (1-M LiTFSI in DOL:DME) has the highest conductivity, which decreases when adding $LiNO_3$ additive and polysulfide $Li_2S_6$ due to the increase of viscosity. This ensures the possible depletion of polysulfide inside the catholyte since the Li ion diffusion through the catholyte will not be slowed down during either a charge or discharge process when polysulfides are converting to solid elemental sulfur or $Li_2S_2$/$Li_2S$, respectively. When the catholyte volume is small and the charge/discharge rate is slow, the complete utilization of the polysulfides can be realized; whereas, as illustrated in FIG. 8B, increasing the catholyte volume will increase the diffusion lengths for polysulfide ions traveling from the catholyte pool to the reaction site, i.e. the surface of the CNT, and thereby decrease the capacity. This explains the decrease of capacity when increasing catholyte volume from 7.5 to 10 μL/mg (see FIG. 6). The effect of the catholyte volume can be confirmed by SEM images of the electrode after cycling tests at the charged state without washing away lithium salts in the electrolyte (i.e. LiTFSI and $LiNO_3$), as shown in FIGS. 8C and d. The CNT sponge is completely filled with residual lithium salts for cell with 10 μL/mg of 4-M [S] catholyte, comparing with the porous morphology for the cell with 7.5 μL/mg of 4-M [S] catholyte. But, after washing away the residual lithium salts, porous morphologies can be maintained for both electrodes (see FIGS. 8E and F). Uniform deposition of sulfur on CNTs rather than aggregation of big sulfur particles can also be observed. These characteristics of the CNT sponge electrode also contribute to the high utilization of active materials and excellent cycling performances.

FIG. 9A shows the excellent rate capability of a semi-liquid Li—S cell with 10 μL/mg of 2-M [S] catholyte. The discharge cut-off voltage is 1.75 V for 0.25 and 0.5 C, 1.7 V for 1~4 C, and 1.6 V for 5 and 6 C (1 C=1600 mA/g). The average discharge capacities at 0.25 C, 0.5 C, 1 C, 2 C, 3 C, 4 C, and 5 C are 903, 846, 798, 759, 749, 726, 730, 271 mAh/g, respectively. For the discharge at 5 C, the actual time for one discharge is about ~5 min, but the retained capacity is about ~80% of that delivered at 20 times slower rate (0.25 C) for about ~2.2 h. FIG. 9B shows the voltage profiles of the Li—S cell at different rates, indicating the typical increase of the Ohmic overpotential when increasing the current density. At high rate, the trench between the two voltage plateaus becomes deeper, which is believed to be due to the increased polysulfide concentration polarization in the catholyte. At 6 C, the trench is deeper than the voltage limit, leading to the absence of the second voltage plateau and a sudden decrease in the capacity.

After being cycled at different rates for 48 cycles, this Li—S cell was rested for 3 weeks at charged state. The open circuit voltage decrease to about 2.22 V. The first discharge at 0.25 C rate shows only the second voltage plateau ~2.1 V and a discharge capacity lower than that before the resting (see FIG. 9C), indicating the formation of dissolved polysulfides during the rest by the reaction between the residual polysulfides in the catholyte with the elemental sulfur formed at the end of the charge before the rest ($xS+S_n^{2-} \rightarrow S_{n+x}^{2-}$). But, after a full charge to 3 V, the second discharge shows two voltage plateaus and a capacity of 875 mAh/g, close to 910 mAh/g of the last discharge before the rest (see FIGS. 8A and C). Meanwhile, the cell subsequently cycled at 1 C rate for more than 230 cycles achieved stable discharge capacities around ~760 mAh/g (also close 798 mAh/g at 1 C before the rest), as shown in FIG. 8A. This behavior confirms the stable solid-electrolyte interface formed on the Li metal anode, which prevents further passivation of polysulfides on Li metal and thereby the polysulfide shuttle. Similar behavior was also obtained for a Li—S cell with 7.5 μL/mg of 4-M [S] catholyte, which also shows stable discharge capacity close to that of the last discharge before a 3-week's rest at 1 C rate for ~300 cycles.

In an embodiment of the invention, the $Li_2S_6$ catholyte concentration and loading volume are varied to optimize performance. Smaller loading volume showed higher capacity, while higher loading volume resulted in better cycling performances. Comparing to reported solid sulfur electrodes and Li-ion electrodes, much higher energy density and specific capacity were obtained from our semi-liquid electrodes due to the absence of Al current collector and high sulfur loading weight. The cell with 10 μL/mg of 4-M [S] catholyte achieved both high electrode energy density (903.6 Wh/kg) and excellent cycling performances (81.4% capacity retention and 0.023% capacity fading rate in 800 cycles), which is one of the best performances reported by far. High C-rate capability was also achieved by a cell with 10 μL/mg of 2-M [S] catholyte, which showed ~80% capacity retention at 5 C rate comparing with capacity at 20 times slower rate (0.25 C). Furthermore, the semi-liquid cell showed no obvious degradation after resting at charged state for 3 weeks, confirming the stable surface condition on Li metal anode and the suppressed polysulfide shuttle in the cell.

WORKING EXAMPLES

Synthesis of carbon-coated mesoporous Si (C-mSi). Mesoporous Si was synthesized by a magnesiothermic method. Mesoporous $SiO_2$, SBA-15 was prepared, and then mixed and ground with Mg powder (molar ratio of Mg:Si=2:1) in a mortar. The mixture was then sealed in a ¼" Swagelok coupling and transferred to a tube furnace in Ar (100 sccm). The temperature was ramped up to 650° C. at a rate of 5° C./min, and kept constant for 2 h. The obtained powders were washed with 2-M HCl overnight and then 5-wt % HF for 10 min. After washing the powder with ample deionized water, the obtained bright-brown Si powders were vacuum-dried at 60° C. for 6 h. To obtain a carbon coating, the Si powders in a crucible were transferred into a tube furnace, and temperature was ramped up to 800° C. in 30 min in a flow of 100-sccm Ar, and then 20-sccm $C_2H_2$ was added to the Ar flow for 15 min. By measuring the weight of the powders before and after the carbon coating, carbon contents in the power was estimated to be 31.7 wt %.

Synthesis of S/CMK-8 cathode. CMK8 replicating the template silica KIT-6 was synthesized. Sulfur powder was mixed with CMK-8 with a weight ratio of S:CMK-8=6:4. The mixture was then annealed in Ar atmosphere at 155° C. for 12 h to infuse the molten sulfur into pores of CMK-8. For the fabrication of sulfur cathode, S/CMK-8, carbon black, and poly(vinylidene fluoride) binder were mixed at a weight ratio of 80:10:10 in N-Methyl-2-pyrrolidone (NMP) to form a slurry. S was 48 wt % in the whole electrode. Subsequently, the slurry was coated onto a 25-μm thick Al foil, and then vacuum dried at 50° C. for 12 h.

Prelithiation of C-mSi. The Si electrode was fabricated by coating the slurry of C-mSi, carbon black, poly(acrylic acid) (Mw=100,000; Aldrich), and sodium carboxymethyl cellulose (viscosity 50-200 cP, 4 wt % in $H_2O$, Aldrich) (weight ratio of 6:2:1:1 in DI water) onto Cu foil, which was then vacuum-dried at 150° C. for 2 h. The lithiation of the Si electrode was conducted by pressing the Si electrode in direct contact with a Li metal foil (99.9%, Alfar Aesar) between two glass slides with binder clips for 12 h in an Ar-filled glove box. Several drops of an electrolyte (a mixture of 1-M lithium bis(trifluoromethane) sulfonamide (LiTFSI) and 1-wt % $LiNO_3$ in dioxolane and dimethoxyethane (DOL:DME=1:1 ratio by volume) were added to wet the Si electrode and Li metal foil.

Synthesis of CNT interlayer. Single-walled carbon nanotubes (Cheap Tubes, Inc.) were dispersed in NMP for 1 h with a pen-type sonicator and another 1 h with bath-type sonicator. The obtained solution was filtrated and then vacuum-dried at 120° C. for 20 h. The obtained CNT paper was punched into the electrode size for the use of battery cell.

Cell assembly and testing. A S/CMK-8 film for cathode along with a Li metal foil (Li—S cell) or lithiated C-mSi (LSS cell) for anode were assembled in a 2023-type coin cell. The weight ratio C-mSi of S was ~1. For all coin cells, Celgard 2400 was used as a separator, and 1-M LiTFSI and 1-wt % $LiNO_3$ in DOL:DME (1:1 by volume) as an electrolyte. When the CNT interlayer was used, it was inserted between the cathode and the separator. Arbin BT2000 was used for the galvanostatic charge/discharge of the coin cells. The Li—S cell was cycled between 1.5~3 V, and the LSS full cell was cycled between 1.4~3 V (other than mentioned). The C rate (1 C=1600 mAg$^{-1}$) and the capacities of Li—S and LSS cells were calculated based on the weight of sulfur.

Short-circuit experiments. For the internal short-circuit experiments, separators punctured to create 9 holes by using a needle were assembled to make coin cells, and they were cycled at 0.5 C rate. The external short-circuit experiments were conducted by directly connecting cathode and anode with a Cu wire (~100 mOhm) for 3 h. The cell was subsequently charged at 0.5 C rate.

Structure characterization. X-ray diffraction (XRD) measurements were performed with a Bruker instrument (Bruker-AXS D8 VARIO) with Cu Kα radiation. The patterns were measured from 2θ=15 to 75° with a step size of 0.01° and dwell time of 0.1 s. JEOL JSM-7500F and JEM-2010 were used for SEM and TEM images, respectively. For taking SEM images of Li metal foil and CNT interlayer after testing, they were first washed with a plenty of DOL to remove LiTFSI and subsequently sealed in a glass vessel in an Ar-filled glove box, and then quickly transferred into the chamber of the SEM with minimum exposure to room air.

Synthesis of catholyte. Polysulfide cathoolyte ($Li_2S_6$) was synthesized by directly reacting elemental sulfur with stoichiometric $Li_2S$ in electrolyte. First, 1-M LiTFSI+0.5 M-$LiNO_3$ was dissolved in DOL:DME=1:1 (by volume). Then, S and $Li_2S$ with a molar ratio of 5:1 were added into the electrolyte to form 2 M and 4 M $Li_2S_6$ (molar concentration calculated based on S atom). The mixture was heat-treated in an oil bath at 90° C. for 3 days with continuous stirring in the Ar atmosphere to form reddish catholyte solution.

Synthesis of carbon nanotubes (CNT) sponge. CNT sponge was synthesized by a chemical vapor deposition (CVD) method similar to that reported by Gui et al. Ferrocene and 1,2-dicholorbenzene will be used as the sources of Fe catalysts and carbon, respectively. 60 mg/ml of ferrocene dissolved in 1,2-dichlorobenzene was continuously delivered into a 1-inch quartz tube by a syringe pump at a feeding rate of 8 ml/h. A 3-zone furnace was used, with the temperatures of the first two zones set at 250° C. and the third set at 860° C. A carrier gas mixture of Ar and $H_2$ was flowed at a rate of 1000 sccm and 300 sccm, respectively. A quartz plate was placed in the third zone for the growth of sponges. After a growth of about 3 hours, the CNT sponge was detached from the quartz plate.

Electrochemistry. Semi-liquid Li—S batteries were assembled into 2023-type coin cells. First, Li metal foil was wetted with a drop (~10 μL) of the electrolyte, i.e. 1-M LiTFSI+0.5-M $LiNO_3$ in DOL:DME (1:1 vol.). Then, separator Celgard 2400 was stacked on the top. Subsequently, the CNT sponge with a thickness ~1 mm was placed on top of separator and then catholyte was dropped to the CNT sponge. For both 2-M $Li_2S_6$ and 4-M [S] catholyte, the volumes loaded were 7.5 μL, 10 μL per miligram of CNT sponge, respectively. The weight ratios of S to CNT were 0.96, 1.28 for 7.5 μL/mg, 10 μL/mg of 4 M catholyte, and 0.48, 0.64 for 7.5 μL/mg, 10 μL/mg of 4 M catholyte, respectively. Arbin BT2000 was used for the galvanostatic charge/discharge of coin cells. Li—S cells were cycled between 1.7~3 V at different rates (1 C=1600 mA/g) and the capacity was calculated based on the equivalent weight of sulfur in the catholyte.

Structure characterization. Field-emission scanning electron microscope (SEM) and transmission electron microscope (TEM) were inspected with a JEOL JSM-7500F, and JEOL JEM-2010, respectively. For the CNT sponge at charged state, the sponge taken from the disassembled Li—S cell was washed with DOL and then dried for the SEM. For the measurement of ion conductivity of catholyte, an eDAQ ET915 miniature dip-in conductivity probe was used.

While the present invention has been described in terms of certain preferred embodiments, it will be understood, of course, that the invention is not limited thereto since modifications may be made to those skilled in the art, particularly in light of the foregoing teachings.

What is claimed is:

1. A device, comprising:
    an anode that includes a lithiated silicon-based material;
    a current collector-free electrode comprising a sulfur-based cathode; and
    a reservoir that houses the sulfur-based cathode, wherein the reservoir comprises a flexible, porous carbon structure, wherein the porous carbon structure comprises liquid sulfur catholyte within its pores, and wherein the porous carbon structure comprises carbon nanotubes that are physically bonded together and intertwined.

2. The device of claim 1, further comprising a separator between the sulfur-based cathode and the anode, wherein the separator is configured to facilitate transport of lithium ions between the anode and the sulfur-based cathode and to inhibit flow of other materials therebetween.

3. The device of claim 1, wherein the porous carbon structure is a carbon nanotube sponge.

4. The device of claim 1, wherein the porous carbon structure is an electrically conducting reservoir.

5. The device of claim 3, wherein the carbon nanotube sponge is a reservoir for a liquid polysulfide.

6. The device of claim 1, wherein the anode comprises mesoporous silicon.

7. The device of claim 3, wherein the carbon nanotube sponge comprises any of single-walled, double-walled, and multi-walled carbon nanotubes.

8. A semi-liquid lithium-sulfur battery comprising:
    a lithium anode;
    a current collector-free electrode comprising a sulfur cathode; and
    a liquid catholyte containing a $LiNO_3$ additive, wherein the liquid catholyte is housed within pores of a flexible, porous carbon nanotube sponge reservoir, wherein the reservoir comprises carbon nanotubes that are physically bonded together and intertwined.

9. The semi-liquid lithium-sulfur battery of claim 8, wherein the liquid catholyte comprises polysulfide.

10. The semi-liquid lithium-sulfur battery of claim 8, wherein the carbon nanotube sponge is elastic.

11. The semi-liquid lithium-sulfur battery of claim 9, wherein the liquid catholyte is $Li_2S_6$.

12. A semi-liquid lithium-sulfur battery comprising:
    a carbon nanotube sponge anode comprising lithium;
    a current collector-free electrode comprising a sulfur cathode; and
    a liquid catholyte containing a $LiNO_3$ additive, wherein the liquid catholyte is housed within pores of a flexible, porous carbon nanotube sponge reservoir, wherein the reservoir comprises carbon nanotubes that are physically bonded together and intertwined.

13. A method to produce a lithiated silicon-sulfur battery, the method comprising:
    synthesizing a current collector-free sulfur cathode;
    synthesizing a silicon anode, wherein the silicon anode is lithiated; and
    placing the cathode in a reservoir, wherein the reservoir is a flexible, porous carbon nanotube sponge and the reservoir contains a liquid catholyte and wherein the reservoir comprises carbon nanotubes that are physically bonded together and intertwined.

14. The method of claim 13, wherein synthesizing the sulfur cathode comprises infusing sulfur into a porous material, wherein the porous material serves as a charge transfer path and a polysulfide reservoir.

15. The method of claim 14, wherein the porous material comprises carbon nanotubes that are synthesized by chemical vapor deposition and are physically bonded to each other.

16. The method of claim 13, wherein synthesizing the silicon anode comprises:

reducing mesoporous silica magnesiothermically; and
lithiating the mesoporous silica.

\* \* \* \* \*